United States Patent [19]
Rubio

[11] 3,853,997
[45] Dec. 10, 1974

[54] TORTILLA AND PROCESS USING SORBIC ACID AND ITS SALTS

[75] Inventor: Manuel Jesus Rubio, Bridgeport, Conn.

[73] Assignee: Roberto Gonzalez Barrera, Monterrey, N.L., Mexico

[22] Filed: July 24, 1970

[21] Appl. No.: 58,143

[52] U.S. Cl.................. 426/151, 426/331, 426/335
[51] Int. Cl............................................. A21d 13/00
[58] Field of Search........ 99/80, 90 P, 93, 153, 222, 99/224; 426/151, 331, 335

[56] References Cited
UNITED STATES PATENTS
2,584,893  2/1952  Lloyd et al.............................. 99/93
3,065,080  11/1962  Melnick.............................. 99/90 P

OTHER PUBLICATIONS

Zelayeta "Elena's Secrets of Mexican Cooking" Prentice–Hall, Inc., Englewood Cliffs, N.J. March 1962, pages 115–121.

Primary Examiner—Raymond N. Jones
Attorney, Agent, or Firm—Jackson, Jackson & Chovanes

[57] ABSTRACT

To retard the microbiological spoilage of tortillas and tortilla flour. They are unleavened, unshortened food products made from nixtamalized corn or nixtamalized corn flour. Sorbic acid and its water soluble salts may be used.

3 Claims, No Drawings

TORTILLA AND PROCESS USING SORBIC ACID AND ITS SALTS

DISCLOSURE OF INVENTION

The present invention relates to retarding the microbiological spoilage of tortillas and tortilla dough.

Many expedients which apply for preventing microbiological spoilage of the usual wheat, whole wheat or rye flour commonly eaten, are not effective when applied to tortilla and tortilla dough, because of the marked difference in their composition from the breads mentioned above. Among these differences are:

1. Tortillas are made from whole corn, that is, corn which contains its germ, hull, bran, etc. Bread is made from dehulled, degermed and debranned wheat.
2. Dehulled, degermed, debranned wheat used in making bread undergoes no chemical treatment before grinding. Whole corn used in making tortillas always undergoes the chemical treatment of steeping in limewater at pH 12 before grinding.
3. Dehulled, degermed, debranned wheat used in making bread is ground into a flour in the dry state. Steeped whole corn used in making tortillas is ground into a dough in the wet state, after which the dough is either dried into a flour or used directly to make tortillas.
4. The dough used for making bread is always prepared from dry dehulled, degermed, debranned wheat flour. The dough used for making tortillas may be prepared either from dry limed whole corn flour or directly by grinding whole corn steeped in limewater at pH 12.
5. In addition to dehulled, degermed, debranned wheat flour, the dough used for making bread always contains some of the following ingredients: shortening, a leavening agent (yeast, air, or baking powder), salt, sugar, milk solids or milk, eggs, or egg solids, and water. Dough used in making tortillas only contains ground limed whole corn and water.
6. The final moisture content of bread after baking is approximately 20%; that of tortillas after cooking is approximately 45%. Due to its lower moisture content, bread is much less subject to microbial spoilage than tortillas.
7. Bread is baked inside an oven by hot air at a temperature of 425° – 500°F. for 30 to 60 minutes. Tortillas are cooked on a hot plate at 290° – 410°F., each side or face being exposed alternately to the heat for 15 to 20 seconds after which the first side is again exposed for an additional 15 to 20 seconds.
8. Other differences between bread and tortillas are the following:
   a. Dehulled, degermed, debranned wheat flour used in breadmaking is usually bleached; limed corn flour used for making tortillas is never bleached.
   b. Bread is usually leavened; tortillas are never leavened.
   c. Bread is always baked in the shape of loaves or rolls; tortillas are always shaped in the form of round, flat discs.
   d. The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below:

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290°–410°F. In the cooking process, each face or side of the disc is alternately exposed to the heat for 15 to 20 seconds, after which the first side is again exposed for an additional 15 to 20 seconds.

The cooked discs or tortillas have a moisture content of 40 – 48% and are ready to eat.

Limed corn dough may be prepared from limed corn flour of size smaller than 45 U.S. Standard Mesh, 8 – 12% moisture content and pH 6–7. The dough is made by mixing 1.0 – 1.4 pounds of tap water per pound of flour.

Limed corn dough may also be made directly by grinding corn which has been steeped in limewater. In such case 1 pound of corn is steeped overnight in 0.5 – 0.8 pounds of water, initially at boiling temperature, which contains 0.5 – 1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

The invention deals with the addition of substances to limed corn dough and/or tortillas for the purpose of increasing the resistance to micribiological spoilage and increasing their shelf life.

It is known that limed corn dough and tortillas, because of their relatively high moisture content, are very susceptible to attack and spoilage by bacteria, yeasts, molds and other microorganisms. Limed corn dough has a higher moisture content than tortillas and is therefore more susceptible to spoilage. Table 1 gives typical moisture contents and shelf life for limed corn dough and tortillas.

Table 1

Typical Moisture Contents and Shelf Lives at 25°C for Limed Corn Dough and Tortillas without Additives of Any Kind

| Product | Moisture Content | Shelf Life at 25°C |
|---|---|---|
| Dough | 55–60% | 6 hours |
| Tortillas | 42–48% | 12 hours |

The shelf life is the time required to detect unmistakable signs of microbiological spoilage in products. In limed corn dough and tortillas these signs include production of off-flavors and odors, production of "rope" (a polysaccharide resulting from the growth of certain bacteria such as B. mesentericus) and appearance of moldy spots. The shelf life of the product depends upon the temperature at which it is stored. Higher temperatures normally correspond to lower shelf life and lower temperatures normally correspond to longer shelf life. Also, the type of spoilage which first occurs depends upon the temperature. In limed corn cough and tortillas the first sign of spoilage at higher temperatures (above 30°C.) are usually off-flavors due to the growth of bacteria, while at lower temperatures (below 30°C.) the first signs are appearance of moldy spots. Table 2 gives typical shelf lives of limed corn dough and tortillas at different temperatures.

Table 2

Typical Shelf Lives of Limed Corn Dough and Tortillas at Different Temperatures

| Product | Storage Temperature | Shelf Life |
|---|---|---|
| Dough | 37°C | 3 hours |
|  | 25°C | 6 hours |
|  | 15°C | 12 hours |
| Tortillas | 37°C | 6 hours |
|  | 25°C | 12 hours |
|  | 15°C | 18 hours |

The additives of the present invention have the property of retarding growth of microorganisms which cause spoilage in dough and tortillas. They are mixed with the dough, whether it is desired to preserve the dough as such or to convert it into tortillas. The shelf life of dough containing the additives as well as tortillas made from such dough are increased in the manner which will subsequently be shown.

All of the additives of the present invention may be added to the dough in one of the following ways:

1. They may be added to the dough as aqueous solutions, dispersion or suspensions which are thoroughly mixed in the dough so as to form a uniform dispersion of the additive or additives. Since this involves the addition of water to the dough, allowance must be made for the water incorporated with the additive or additives, and compensation may be required in respect to the quantity of other water added.

2. If the dough is made from limed corn flour, the additive may be dissolved, suspended or dispersed in the water which is subsequently to be mixed with the flour to make the dough.

3. In some cases it is preferred to mix the additive with the dry limed corn flour prior to mixing the flour with the water.

The following table shows the effect of adding sorbic acid or its edible water soluble salts such as the sodium, potassium or calcium salts in quantities between 0.05 and 0.5% on the weight of the tortilla.

Table 3

Effect of Sorbic Acid in Increasing the Shelf Life of Limed Corn Dough at 37°C.

| Dose of Sorbic Acid | Shelf Life, Hours |
|---|---|
| 0.1% | 24 |
| 0.3% | 48 |
| 0.5% | 72 |
| Control | 3 |

Propionic acid and various other low molecular weight fatty acids of 1 to 4 carbon atoms and their anhydrides and their edible water soluble salts, such as sodium, potassium and calcium formates, acetates, propionates and butyrates and edible water soluble diacetates such as sodium, potassium and calcium diacetates in doses of 0.1 to 0.8% used with sorbic acid or edible water soluble salts of sorbic acids in the concentrations mentioned have the synergistic effect of increasing the effectiveness of the sorbic acid and of themselves inhibiting microbiological spoilage. The following table shows that they, when used together, are much more effective than sorbic acid or its edible water soluble salts alone.

Table 4

Effect of Combinations of Sorbic Acid and the Sodium Salts of Low Molecular Weight Fatty Acids in Increasing the Shelf Life of Limed Corn Dough at 37°C

| Additive Combination and Dose | Shelf Life, Hours |
|---|---|
| 0.1% Sorbic Acid + 0.2% Calcium Propionate | 48 |
| 0.1% Sorbic Acid + 0.2% Sodium Diacetate | 72 |
| Control I, 0.1% Sorbic Acid alone | 24 |
| Control II, 0.2% Calcium Propionate alone | 24 |
| Control III, 0.2% Sodium Diacetate alone | 18 |
| Control IV, no additive | 3 |

The method of adding these agents is the same as that used to add sorbic acid.

It is preferable to use the sodium or potassium or calcium sorbates if salts of sorbic acid are preferred, and their dosage is the same as sorbic acid.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A tortilla consisting of nixtamalized corn or nixtamalized corn flour, an additive consisting of 0.05 to 0.5% of a compound of the class consisting of sorbic acid and its edible water soluble salts, and an additive of the class consisting of 0.1 to 0.8% of low molecular weight fatty acids having from 1 to 4 carbon atoms in the carbon chain, their anhydrides, their edible water soluble salts, and the edible water soluble diacetates.

2. Tortilla dough essentially consisting of nixtamalized corn or nixtamalized corn flour, water, a first additive of the class consisting of 0.05 to 0.5% on the weight of the tortilla of sorbic acid and its edible water soluble salts, and a second additive of the class consisting of 0.1 to 0.8% on the weight of the tortilla of low molecular weight fatty acids containing 1 to 4 carbon atoms in the carbon chain, their anhydrides, and their edible water soluble salts, and edible water soluble diacetates.

3. The process of making tortillas which are more resistant to microbiological spoilage, which consists of mixing nixtamalized corn or nixtamalized corn flour with water and incorporating in the mixture a first additive of the class consisting of sorbic acid and its edible water soluble salts in a concentration of 0.05 to 0.5% and a second additive of the class consisting of low molecular weight fatty acids having 1 to 4 carbon atoms in their carbon chains, their anhydrides, their edible water soluble salts, and edible water soluble diacetates in proportions of 0.1 to 0.8%.

* * * * *